United States Patent
Dhuler et al.

(10) Patent No.: US 6,677,695 B2
(45) Date of Patent: Jan. 13, 2004

(54) MEMS ELECTROSTATIC ACTUATORS WITH REDUCED ACTUATION VOLTAGE

(75) Inventors: Vijayakumar Rudrappa Dhuler, Raleigh, NC (US); Edward Arthur Hill, Chapel Hill, NC (US)

(73) Assignee: JDS Uniphase Corporation, San Jose, CA (US)

( * ) Notice: Subject to any disclaimer, the term of this patent is extended or adjusted under 35 U.S.C. 154(b) by 19 days.

(21) Appl. No.: 10/244,630

(22) Filed: Sep. 17, 2002

(65) Prior Publication Data

US 2003/0052569 A1 Mar. 20, 2003

Related U.S. Application Data

(60) Provisional application No. 60/323,132, filed on Sep. 18, 2001.

(51) Int. Cl.[7] .......................... H02N 1/00; G02B 26/10; G02B 26/08
(52) U.S. Cl. .................. 310/309; 310/309; 359/223; 359/224; 359/291
(58) Field of Search .................. 310/309; 359/223, 359/224, 290, 291, 298, 872

(56) References Cited

U.S. PATENT DOCUMENTS 5,914,801 A    6/1999   Dhuler et al. ............... 359/230
6,487,001 B2 *  11/2002  Greywall ..................... 359/292
6,504,641 B2 *  1/2003   Chan et al. .................. 359/254

FOREIGN PATENT DOCUMENTS

| JP | 5-119280    | * | 5/1993  | ........... G02B/26/10 |
| JP | 2001-33727  | * | 2/2001  | ........... G02B/26/10 |
| JP | 2001-311900 | * | 11/2001 | ........... G02B/26/08 |

* cited by examiner

*Primary Examiner*—Karl I. Tamai
(74) *Attorney, Agent, or Firm*—Allen, Dyer, Doppelt, Milbrath & Gilchrist, P.A.

(57) ABSTRACT

A movable microelectromechanical mirror structure for a microelectromechanical structure (MEMS) has an actuator (electrodes) for the moving mirror. The electrodes are situated at a predetermined angle to the horizontal thus improving the relationship between force applied on the mirror and the gap between the mirror and the electrodes. The angular electrode placement is achieved by the provision of a deformable electrode support member mounted on the substrate, with at least one of the electrodes mounted on the electrode support member, and a deforming element mounted against the deformable electrode support member such as to permanently maintain the deformable electrode support member in a deformed state.

11 Claims, 2 Drawing Sheets

MEMS ELECTROSTATIC ACTUATORS WITH REDUCED ACTUATION VOLTAGE

RELATED APPLICATIONS

This application claims priority from U.S. provisional application No. 60/323,132 filed Sep. 18, 2001.

TECHNICAL FIELD

This invention relates to microelectromechanical structures and more specifically, to electrostatically actuated mirrors in such structures, and particularly to electrodes of the electrostatic actuators.

BACKGROUND ART

Microelectromechanical structures (MEMS) and other microengineered devices are presently being developed for a wide variety of applications in view of the size, cost and reliability advantages provided by these devices. Many different varieties of MEMS devices have been created, including microgears, micromotors, and other micromachined devices that are capable of motion or applying force. These MEMS devices can be employed in a variety of applications including hydraulic applications in which MEMS pumps or valves are utilized and optical applications which include MEMS light valves and shutters.

MEMS devices have relied upon various techniques to provide the force necessary to cause the desired motion within these microstructures. Some MEMS devices are driven by electromagnetic fields, while other micromachined structures are activated by piezoelectric or electrostatic forces. MEMS devices that are actuated by the controlled thermal expansion of an actuator or other MEMS component have also been developed.

MEMS devices including moveable mirror structures have also been developed. Commonly, MEMS moveable mirror devices have been used to redirect electromagnetic energy traveling along a path, typically a light or laser beam. For instance, U.S. patent application Ser. No. 08/719,711, incorporated by reference herein, describes various types of MEMS devices which can rotate a reflective plate about several axes within a framed structure.

As shown in FIGS. 1a and 1b, explained in detail below, a known electrostatically actuated MEMS mirror structure has a mirror crystal mounted above a substrate for tilting about an axis which is parallel to the substrate. Two stationary electrodes are mounted on the substrate at locations corresponding to the ends of the mirror such that when electrostatic charge is applied to one of the electrodes, the resulting electrostatic force pulls the corresponding end of the mirror towards the electrode to effect a tilting movement of the mirror. The amount of the movement can be controlled such that the tilting progresses up to the point when the end of the mirror touches the electrode.

It is known that in electrostatic actuation, the force generated between the electrode and the tilting mirror element (e.g. a crystal plate) is inversely proportional to the square of a gap between the electrode and the tilting element. Also, the actuation mechanism in the arrangement such as shown in FIGS. 1a and 1b becomes non-linear after the moving plate (mirror) traverses about ⅓ of the initial gap between the electrode and the plate, it has been attempted to devise structures where the driving mechanism (electrodes) would be non-parallel to the moving plate. However, the commercial-scale design of such a structure has encountered problems, mostly because of the difficulty in etching semiconductor structures at an angle to the main plane.

The invention attempts to provide a solution to the above-described problem.

SUMMARY OF THE INVENTION

The invention stems from a finding that an improved MEMS mirror structure, with electrodes at an angle conforming to an angle of the mirror when tilted, can be provided by providing a deformable electrode support and deforming means mounted for permanent predetermined deformation of the electrode support with electrodes thereon. The deforming means may be provided in the form of a deforming member with one or more protrusions disposed to deform the electrode support in a predetermined manner, or a deformable electrode support with one or more protrusions and a complementary deforming member, all the elements shaped and disposed to effect, when assembled, a predetermined deformation of the electrode support and the desired positioning of the electrodes thereon.

In accordance with the invention, there is provided a movable microelectromechanical mirror structure comprising:

a microelectronic substrate defining a first major surface;

a mirror having two ends and disposed for tilting movement in response to an attractive force about an axis disposed out of plane relative to the first major surface, the tilting movement varying between a non-actuated position and a fully actuated position at an end point of the tilting movement, the fully actuating position resulting in an angular position of the mirror at a limit angle relative to the major surface, and a pair of electrodes for exerting each an attractive force on a corresponding end of the mirror, each electrode mounted on the substrate at a position corresponding to the corresponding end of the mirror at an electrode angle to the first major surface, the electrode angle being similar or identical as the limit angle of the corresponding end of the mirror, the dimensions of the mirror, of the electrodes and a spacing between the mirror and the electrodes selected such that the electrode and the corresponding end of the mirror are in an approximately parallel relationship in the fully actuated position when the corresponding end of the mirror becomes adjacent to the electrode due to the attractive force.

The movable mirror structure may comprise a deformable electrode support member mounted on the substrate, with at least one of the electrodes mounted on the electrode support member, and a deforming element mounted against the deformable electrode support member such as to permanently maintain the deformable electrode support member in a deformed state in which the at least one of the electrodes is disposed at the electrode angle.

BRIEF DESCRIPTION OF THE DRAWINGS

The invention will now be described in more detail by reference to the following description in conjunction with the drawings in which.

DETAILED DESCRIPTION OF EMBODIMENTS OF THE INVENTION

Figure 1A:
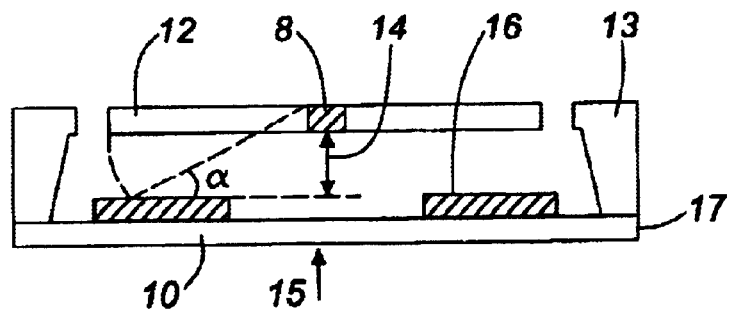
FIGS. 1a and 1b illustrate each a schematic cross-sectional side view of an electrostatically-actuated MEMS mirror structure analogous to a prior art structure.
Figure 1B:
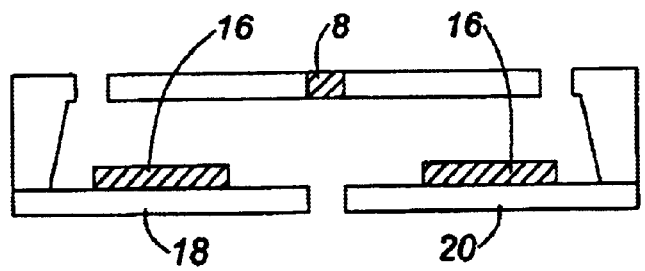

Turning to FIG. 1a and FIG. 1b, the prior art MEMS mirror structure has a rigid electrode support layer 10 forming part of a MEMS substrate. Only part of the MEMS substrate, with one mirror element, is illustrated here, but it is clear to those versed in the art that the substrate can hold a plurality of similar mirror structures, typically in a one-dimensional (1-D) or two-dimensional (2D) array. The layer 10 defines a major surface of the MEMS structure. Mounted generally parallel (in non-activated state) to the support layer 10 is a single crystal 12 with a reflective upper surface thus forming a mirror for reflecting optical beams directed thereto. The mirror crystal 12 is mounted for tilting about an axis 14 fixed to a support structure, not shown here, the axis disposed perpendicular to the plane of the page and parallel to the electrode support layer 10. The dimensions of the structure are selected such that a maximum tilting motion in either direction results in a so-called limit angle α, in practice about 3–5°.

The basic structure corresponding to prior art, see FIG. 1, is manufactured in a manner known in the art and will only be briefly summarized here. The manufacturing process involves bonding two wavers, the mirror wafer 13 and the electrode wafer 17. The mirror wafer is a SOI (silicon on insulator) wafer. The thickness of the top SOI layer is determined by the electrode-to-mirror gap 14. After bonding, the electrode wafer is polished down to the desired thickness, in the specific embodiment of FIG. 1a and FIG. 1b, approximately 50 micrometers. The electrode wafer is a double-side polished silicon wafer. The electrode wafer is oxidized and polysilicon is deposited thereon and patterned to define the electrodes 16. Polysilicon is also deposited on the other side of the electrode wafer and is similarly patterned to compensate for stress and to keep the electrode wafer flat for bonding. The mirror wafer is patterned to form a trench for the tilting movement of the mirror and ledges forming mechanical stops under the end portions of the mirror.

Cavities are etched in the mirror wafer to overlap the electrode pattern on the electrode wafer. This aids in the adequate bonding and also makes the electrodes accessible. Subsequently, the two wafers are bonded, the mirror wafer is polished down to yield the desired mirror thickness (typically 15–25 microns). The top side of the bonded wafer pair is then etched to form the mirror and openings to access the electrodes. The structure is then etched to undercut the electrodes and then metallized to provide reflective mirror surface and electrode contacts. The latter step can also be accomplished using a shadow mask.

While the electrode support member 10 in the prior art may be relatively thick and rigid, the structure of the present invention necessitates the support member 10 to be relatively thin such as to be deformable under a bending force transverse to its surface, e. g. in a direction indicated by the arrow 15. In one embodiment of the invention, the member 10 is of the thickness in the range 30–50 microns.

In another embodiment, as seen in FIG. 1b, the electrode support member may also be formed, e.g. by etching, in two segments, 18, 20, thus forming two cantilevered members, each with one electrode 16 formed thereon.

Figure 3A:
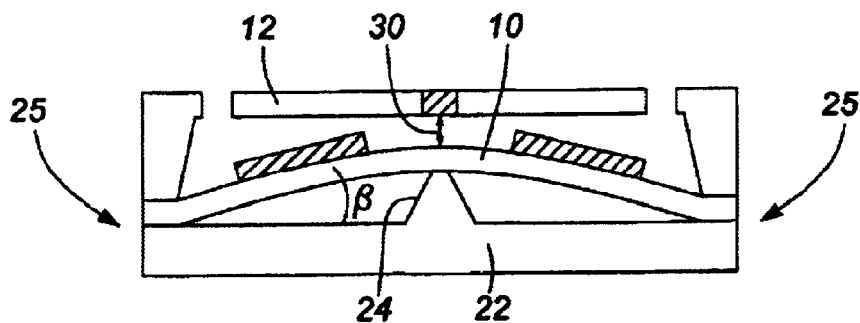
FIG. 3a shows one embodiment of a mirror and electrode structure of the invention, with a unitary electrode support.

FIG. 3a illustrates one embodiment of the present invention, analogous to FIG. 1a. The structure of FIG. 3a has a mirror 12 formed from a mirror wafer 13 as described above, mounted above a, electrode support member 10 formed from a wafer 17. Mounted underneath the member 10 is a deforming member 22 having a projection 24 disposed symmetrically relative the electrode support member and the mirror. The deforming member 22 is of a sufficient rigidity to cause, when attached at its edges 25, a vertical deformation of the member 10 in its middle towards the mirror hinge (axis) 8.

This deformation has the effect of angular displacement of the electrodes 16 such that they form an electrode angle β, similar or identical as the limit angle α described above. As a result, when voltage from a voltage source (not illustrated) is applied to one of the electrodes 16, e.g. the left-hand electrode in FIG. 3a, the thus generated electric field and electrostatic force will attract the corresponding, left-hand end of the mirror 12. The mirror will tilt until its end reaches an end point, defined by a ledge (not illustrated?), at which point the mirror will be inclined at the limit angle α. Since these two angles, the limit angle and the electrode angle are designed to be similar, the actuation voltage is significantly reduced and the relationship between the force and the mirror angular position becomes much more linear, hence advantageous, than in the prior art design similar to that of FIGS. 1a and 1b.

Figure 2A:
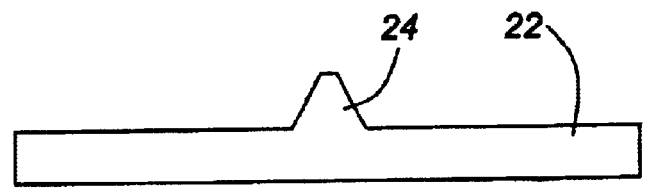
FIGS. 2a and 2b show each a deforming element for the structure of the invention.

FIG. 2a illustrates the deforming element with one projection 24 before assembly.

Figure 2B:
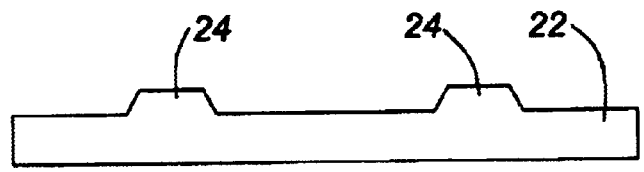
Figure 3B:
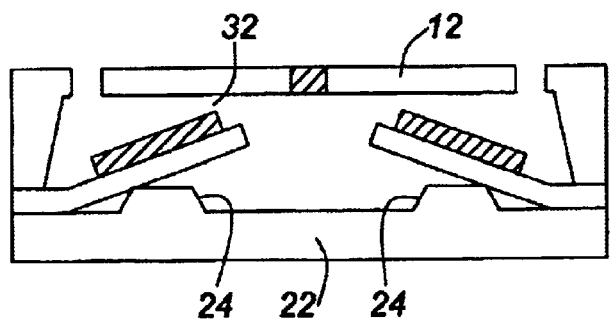
FIG. 3b shows another embodiment of a mirror and electrode structure of the invention, with a cantilevered electrode support.

FIG. 3b is analogous to FIG. 3a except that the deforming member 26 has two projections 24 situated and dimensioned to effect, when mounted underneath the cantilevered electrode support member 18, 20 and affixed to the structure at the edges 24, an upward deformation of the cantilevered electrode supports 18, 20 resulting in a predetermined angular position of the electrodes, similarly as in FIG. 3a and with similar beneficial result. The deforming member 26 is illustrated in FIG. 2b.

Figure 4:
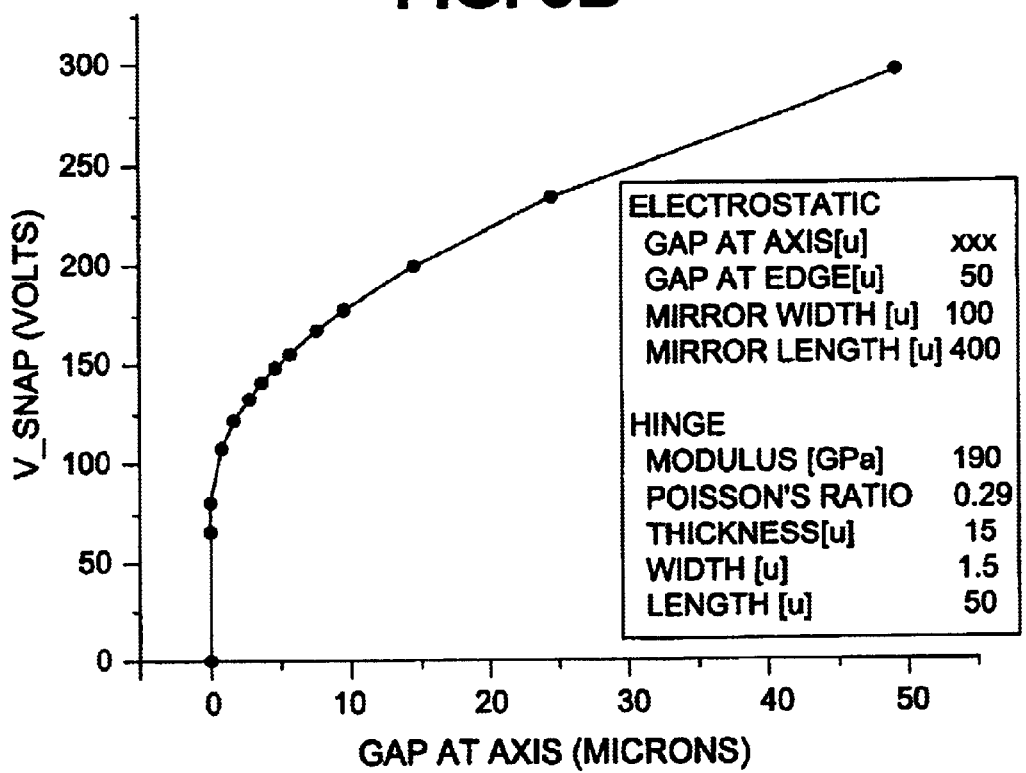
FIG. 4 illustrates a function between the actuation voltage and gap dimension of the structure of the invention.

It will be noted that the upward deformation of the single electrode support member 10 or of the cantilevered members 18, 20 results in a reduced gap between the mirror and either of the electrodes in the non-actuated position illustrated in FIGS. 3a and 3b. In FIG. 3a, the gap 30 is measured between the mirror and the support member 10 in the middle of the member 10. In FIG. 3b, the gap 32 is measured between the mirror and the electrode at the end of the cantilevered member 18 or 20. In either version, an improved relationship is thus formed between the electrode-to-mirror gap and the actuation voltage. The relationship is represented in FIG. 4.

Numerous other embodiments are conceivable to those skilled in the art without departing from the scope and spirit of the invention.

What is claimed is:

1. A movable micro-electromechanical mirror structure comprising:
   a microelectronic substrate defining a first major surface;
   a mirror having two ends and disposed for tilting movement in response to an attractive force about an axis disposed out of plane relative to the first major surface, the tilting movement varying between a non-actuated position and a fully actuated position at an end point of the tilting movement, the fully actuating position resulting in an angular position of the mirror at a limit angle relative to the major surface,
   a pair of electrodes for exerting each an attractive force on a corresponding end of the mirror, each electrode mounted on the substrate at a position corresponding to the corresponding end of the mirror at an electrode angle to the first major surface, the electrode angle being similar or identical as the limit angle of the corresponding end of the mirror, the dimensions of the mirror and of the electrodes and a spacing between the mirror and the electrodes selected such that the electrode and the corresponding end of the mirror are in an approximately parallel relationship in the fully actuated position when the corresponding end of the mirror becomes adjacent to the electrode due to the attractive force, the structure further comprising

- a deformable electrode support member mounted on the substrate, with at least one of the electrodes mounted on the electrode support member, and
- a deforming element mounted against the deformable electrode support member such as to permanently maintain the deformable electrode support member in a deformed state in which the at least one of the electrodes is disposed at the electrode angle.

2. The structure of claim 1 wherein the deforming element comprises at least one protrusion disposed and dimensioned to press against the deformable support member and deform it in a predetermined manner when in an assembled state.

3. The structure of claim 1 wherein the deformable electrode support member comprises at least one protrusion disposed to contact the deforming element and dimensioned to cause a predetermined deformation of the electrode support member.

4. The mirror structure of claim 1 wherein two electrodes corresponding each to one end of the mirror are attached to the deformable electrode support member.

5. The mirror structure of claim 1 wherein the deformable electrode support member forms a cantilever structure with only one electrode mounted thereon.

6. The structure of claim 1 wherein the deforming element is in direct contact with the electrode support member.

7. The structure of claim 1 wherein the deforming element is a rigid layer having at least one protrusion extending towards the electrode support member and dimensioned to effect a predetermined deformation of the electrode support member in contact with the deforming element.

8. The structure of claim 1 wherein the deforming element is coextensive with the deformable electrode support member.

9. The structure of claim 1 further comprising electric means for applying an electric voltage to the electrodes.

10. The structure of claim 9 wherein the electric means are means for creating electric field between one of the electrodes and the mirror in an actuated state.

11. The structure of claim 7 wherein the electric means are means for creating electromagnetic field between one of the electrodes and the mirror in an actuated state.

* * * * *